(12) United States Patent
Lutz et al.

(10) Patent No.: US 7,678,193 B2
(45) Date of Patent: Mar. 16, 2010

(54) PRODUCT FOR TREATING REINFORCED CONCRETE CONSTRUCTIONS

(75) Inventors: Theophil Markus Lutz, Morges (CH); Christian Chevret, Cranves Sales (FR)

(73) Assignee: Arts Technology S.A., Satigny (CH)

( * ) Notice: Subject to any disclaimer, the term of this patent is extended or adjusted under 35 U.S.C. 154(b) by 68 days.

(21) Appl. No.: 10/552,222

(22) PCT Filed: Mar. 30, 2004

(86) PCT No.: PCT/IB2004/001123

§ 371 (c)(1),
(2), (4) Date: Sep. 25, 2006

(87) PCT Pub. No.: WO2004/089844

PCT Pub. Date: Oct. 21, 2004

(65) Prior Publication Data

US 2007/0111034 A1    May 17, 2007

(30) Foreign Application Priority Data

Apr. 9, 2003  (CH) .................................. 0640/03

(51) Int. Cl.
*C04B 24/00* (2006.01)
*C04B 28/02* (2006.01)
*C09D 5/08* (2006.01)
*C23C 22/05* (2006.01)
*C23F 11/167* (2006.01)
*B05D 1/00* (2006.01)
*B05D 5/00* (2006.01)
*B05D 7/00* (2006.01)

(52) U.S. Cl. .................... 106/806; 106/14.12; 106/643; 106/717; 106/724; 106/802; 106/810; 106/823; 427/421.1; 427/428.01; 427/429; 427/443.2

(58) Field of Classification Search ................. 106/643, 106/728, 810, 717, 724, 802, 806, 823, 14.12; 427/421.1, 428.01, 429, 443.2
See application file for complete search history.

(56) References Cited

U.S. PATENT DOCUMENTS

| | | | |
|---|---|---|---|
| 4,098,614 A | 7/1978 | Ray | 106/90 |
| 6,402,990 B1 * | 6/2002 | Marazzani et al. | 252/389.31 |
| 6,712,995 B2 * | 3/2004 | Marazzani et al. | 252/389.31 |
| 2005/0258401 A1 * | 11/2005 | Lane et al. | 252/387 |

FOREIGN PATENT DOCUMENTS

| | | |
|---|---|---|
| WO | WO 93/12052 A | 6/1993 |
| WO | WO 01/55052 A | 8/2001 |
| WO | WO 02/24973 A | 3/2002 |

OTHER PUBLICATIONS

C. Monticelli, A. Frignani, G. Trabanelli; "A study on corrosion inhibitors for concrete application"*Cement and Concrete Research*, 30 (2000), pp. 635-642 (XP-002260698).

Mitsunori Kawamura, Hirohito Fuwa; "Effects of lithium salts on ASR gel composition and expansion of mortars"*Cement and Concrete Research*; 33 (2003), pp. 913-919 (XP002260699).

* cited by examiner

*Primary Examiner*—Anthony J Green
(74) *Attorney, Agent, or Firm*—Frommer Lawrence & Haug LLP; Ronald R Santucci

(57) ABSTRACT

The invention relates to the use of lithium glycerophosphate for treating structures made of a cement-based product and having steel rebars, making it possible to inhibit rebar corrosion, to prevent the alkali reaction and to avoid the presence of alkalis and sulfates in the structure.

9 Claims, 4 Drawing Sheets

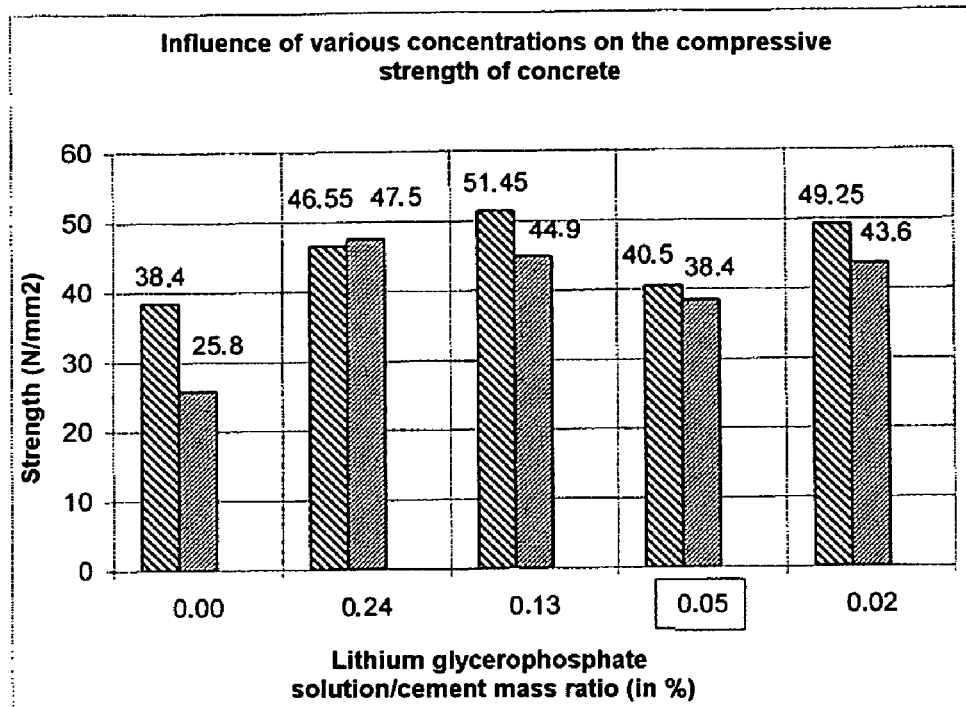
Fig. 5   Usual concentration = 0.05%
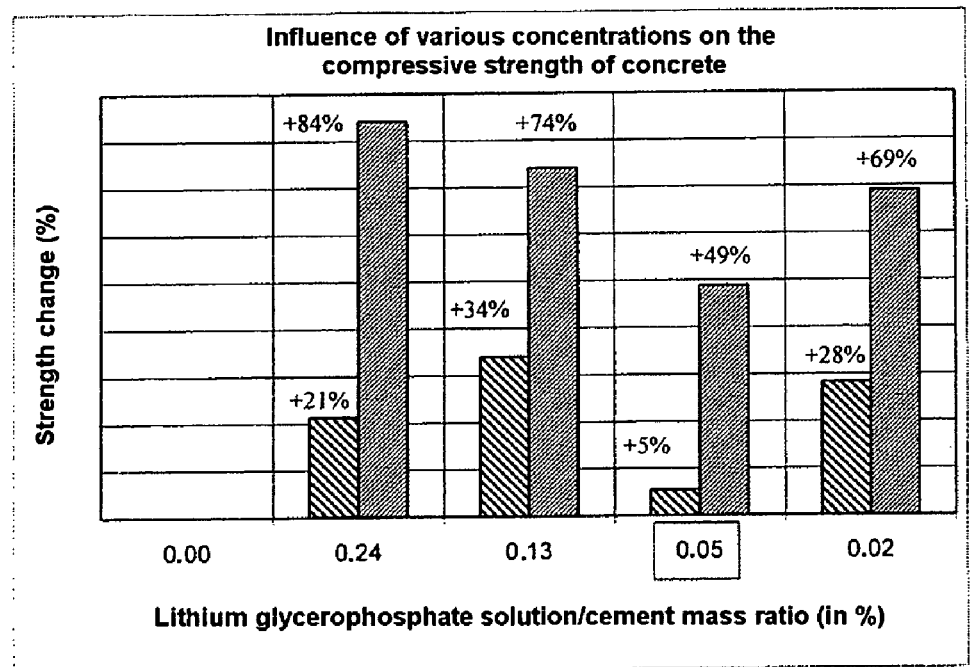
Fig. 6   Usual concentration = 0.05%
▨ Trial after 28 days
▨ Trial after 7 days

PRODUCT FOR TREATING REINFORCED CONCRETE CONSTRUCTIONS

This is a 371 filing of international application number PCT/IB 2004/001123 filed Mar. 30, 2004, published on Oct. 21, 2004 under publication number WO 2004/089844 A and claims priority benefits from Swiss Patent Application No. (CH) 0640/03 filed Apr. 9, 2003.

BACKGROUND OF THE INVENTION

The present invention relates to the construction field. It relates in particular to the treatment of structures made from a cement-based product and having steel rebars, allowing rebar corrosion to be inhibited, preventing the alkali reaction and avoiding the presence of alkalis and sulfates in the structure.

Steel rebars in structures made from concrete are subject to corrosion. The concrete itself may undergo degradation by spalling due to swelling as a result of alkali reactions and to the presence of sulfates or alkalis. This spalling generates cracks that allow water to penetrate into the structure and thus promotes rebar corrosion. This phenomenon is perpetuated until the concrete has been completely destroyed.

Rebar corrosion is promoted by contaminating elements, such as chlorides present in particular in the original sea sand used, owing to the scarcity of river sand, or provided by the salts used for deicing roadways. These contaminants may also be found in sullied demolition-recycling or quarry aggregates, or in products used lately as concrete admixtures (chlorides or sulfates).

The carbonation of concrete reduces the pH of concrete structures. The rebars, surrounded by concrete, are then no longer protected by its high pH and become sensitive to corrosion. Concrete cracking due to the reactions described above promotes the penetration of water into the structure and consequently corrosion of the rebars.

DESCRIPTION OF THE PRIOR ART

It is known from the document "A study on corrosion inhibitors for concrete applications" by C. Monticelli et al. to use sodium glycerophosphate for treating concrete structures and protecting their rebars from corrosion.

It is also known, from application WO 93/12052, to use lithium compounds to inhibit alkali reactions in concrete structures.

U.S. Pat. No. 4,098,614 discloses the use of glycerophosphates, in particular lithium glycerophosphate for improving the compressive strength of concrete structures.

Patent application WO 02/24973 discloses the use of glycerophosphates for preventing metal corrosion.

Patent application WO 01/55052 discloses the use of sodium monofluorophosphate for inhibiting the corrosion of steel rebars of a concrete structure.

SUMMARY OF THE INVENTION

The object of the invention is to treat structures in a preventative or curative manner against these phenomena. The invention proposes in particular to inhibit the corrosion of corroded steel rebars, or of steel rebars that have not yet corroded, and to reinforce the cement mix by preventing the alkali reaction and avoiding the presence of alkalis and sulfates in the structures.

These objects are achieved by the use of lithium glycerophosphate for treating structures made of a cement-based product and having steel rebars.

Various ways of implementing methods for treating a structure include applying a composition containing lithium glycerophosphate wherein said composition is an aqueous solution; impregnating said structure with said aqueous solution containing lithium glycerophosphate; impregnating said composition by applying said composition to a surface of said structure; applying an amount of lithium glycerophosphate from 0.003 to 3 mol/m2; applying said composition using means selected from the group consisting of a brush, a roller and a spray device; treating a cement-based product and steel rebars, wherein said steel rebars are exposed to open air to inhibit corrosion of said steel rebars, said method comprising the step of covering said rebars with a paint containing lithium glycerophosphate, wherein said paint may be an aqueous based paint; and include treating a not yet solidified cement based paste intended to solidify and immobilize steel rebars thereby forming a structure comprising said rebars and a solidified cement based product, said method comprising the step of incorporating a composition containing lithium glycerophosphate into said not yet solidified cement based paste wherein an amount of between 0.001 wt% and 1 wt% lithium glycerophosphate may be incorporated into said paste and wherein said composition is an aqueous solution.

A structure according to the invention includes a cement-based product and steel rebars, wherein a composition containing lithium glycerophosphate is applied to said structure, a cement-based product and steel rebars, wherein said rebars are covered with a paint containing lithium glycerophosphate, and a cement-based product and steel rebars obtained by incorporating a composition containing lithium glycerophosphate into the not yet solidified cement based paste.

BRIEF DESCRIPTION OF THE DRAWINGS

FIGS. 1 to 9 show test results that prove the effectiveness of lithium glycerophosphate for the treatment of structures made from a cement-based product and having steel rebars.

DESCRIPTION OF THE PREFERRED EMBODIMENTS

Figure 1:
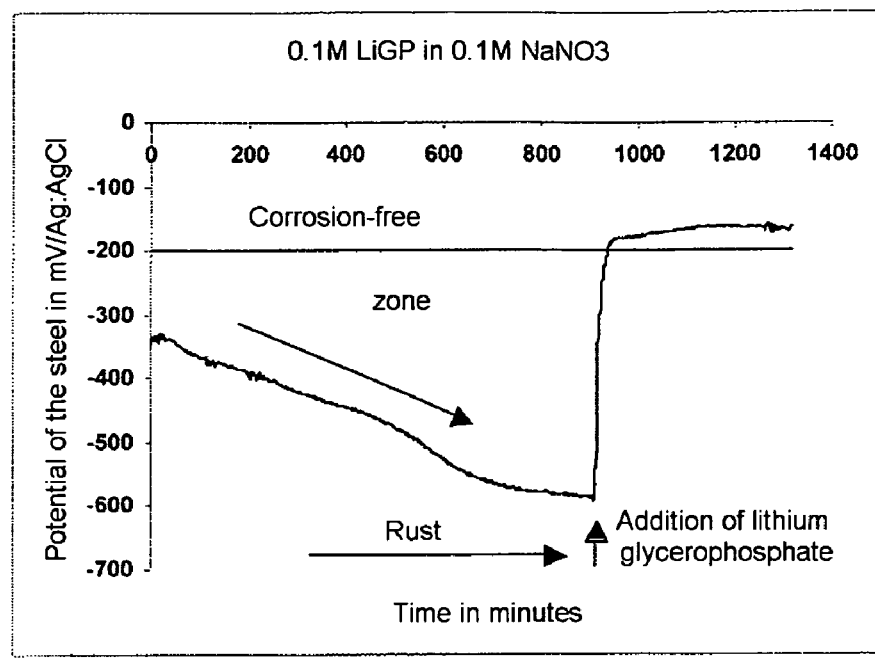

It has been found that lithium glycerophosphate has, in addition to a role of inhibiting corrosion of steel rebars held captive in cement-based products, such as concrete and mortar, the ability to protect the concrete from degradation due to alkali reactions and it has a much greater penetrability into concrete than that of the known inhibitors.

The ability of a lithium glycerosphosphate to inhibit corrosion on steel that may or may not have already corroded can be observed by impregnating a structure made from a cement-based product containing steel with a lithium glycerophosphate composition. The ability of lithium glycerophosphate to prevent alkali reactions may be observed at the same time.

The treatment of a concrete structure which has for example undergone degradation due to sulfates and its exposed rebars have undergone corrosion as a result, or in a concrete that has cracked right to its rebars, will be described below.

Owing to the alkali reaction, the rebars are subject to corrosion. According to the invention, an aqueous lithium glycerophosphate solution containing 0.1 to 0.5 wt % lithium glycerophosphate is used to treat such structures. This aqueous solution is applied directly to the structure, for example using a brush or roller, or else by spraying using a lowpressure spray device. This solution rapidly impregnates the structure owing to the porosity of the concrete and the ability of the glycerophosphate to penetrate the concrete. The application is made as a single layer or as several layers, allowing between 1 and 2 grams of lithium glycerophosphate per m² of concrete to be treated to spread over the surface of the structure.

The object of this application is to obtain, in a region penetrating into the concrete by about 50 mm from the surface where the solution is applied, a lithium glycerophosphate concentration of between 0.001 wt % and 0.5 wt % in the concrete. The rebars that have to be corrosion-inhibited and the concrete that has to be protected from alkali reactions lie within this region. Preferably, the concrete is impregnated with 1.2 grams of lithium glycerophosphate per m² of concrete to be treated, so as to achieve a lithium glycerophosphate concentration of 0.01 wt % in the concrete. Other quantities of glycerophosphate may be applied to the structure. The quantity to be impregnated per unit area of structure to be treated depends in particular on the location of the rebars to be treated relative to the application surface, on the porosity of the concrete and on the concentration of contaminants. It will be understood that if the concrete is not very porous or if the rebars are located relatively far from the surface to which the product is applied, or if the concrete is highly contaminated, it is necessary to increase the quantity of lithium glycerophosphate so as to obtain a lithium glycerophosphate concentration near the rebars that is sufficient to inhibit corrosion of the steel and to avoid alkali reactions. Tests, which will be explained in detail later in the present application, show that, above a lithium glycerophosphate concentration of 0.001 wt % in the concrete, stabilization of the alkalis and sulfates and a very substantial corrosion inhibition effect are already obtained. However, a glycerophosphate concentration of 0.01 wt % in the concrete is preferred, owing to the great heterogeneity of concretes within the same structure.

The above treatment may thus be applied, for preventative purposes, to a structure that has not undergone either carbonation, or an alkali reaction, or has not been subjected to other contamination. In particular, it may be applied preventively to sound structures, in which the rebars have not yet corroded and/or there is not yet any visible cracking.

The lithium glycerophosphate solution used may contain other compounds that also have a corrosion inhibition function or different functions. In particular, it is possible to use a solution containing components which, in addition to inhibiting corrosion, reinforcing the structures and preventing alkali reactions and the presence of sulfates, allow the solution to be dyed or pigmented for decorative reasons. Furthermore, the lithium glycerophosphate may be incorporated into paints, for example water-based paints intended to be applied to structures formed from a cement-based product.

To inhibit corrosion on the steel making up the rebars exposed to the open air, it is proposed to use a cement-based paint or slurry to which a lithium glycerophosphate has been added. This paint or slurry is applied to the steel rebars, for example using a brush, a roller, a paint gun or an airless spray gun.

The ability of lithium glycerophosphate to inhibit corrosion on steel may also be observed when it is incorporated into a cement-based paste intended to immobilize the steel after solidification and in the presence of contaminants.

To inhibit corrosion on steel that will be contained in a structure made from a cement-based product, it is proposed to use lithium glycerophosphate by itself or in combination with calcium glycerophosphate or other glycerophosphates.

We will now explain in detail the method for producing a paste of cement-based product for protecting the rebars that will be placed therein and where a risk of degradation exists owing to the presence of contaminants, such as sulfates, alkalis and chlorides. A concrete is prepared from a cement, for example of the Portland type, sand, aggregate, for example smaller than 15 mm, and water. These products are mixed until a homogeneous paste is obtained. A 1% aqueous lithium glycerophosphate solution is then added. These products then continue to be mixed until a homogeneous product is obtained. The amount of solution added is such that the concentration by weight of glycerophosphate in the paste is between 0.001% and 0.5%. Preferably, the amount of solution added is such that the concentration by weight of glycerophosphate in the paste is 0.01%. The concrete paste thus prepared can then be poured, having beforehand positioned the steel rebars intended to reinforce the structure. The rebars may in particular consist of prestressed cables that are very vulnerable to alkalis.

In the two methods described above, lithium glycerophosphate is used as corrosion inhibitor and as reinforcement and protection agent against cracking due to sulfates and alkalis. This compound has the advantageous characteristic of being non-toxic—for example it is used in the pharmaceutical industry for its benefits to humans.

We will now present in detail a series of trials carried out in the laboratory and on a construction. These trials demonstrate the benefit of using lithium glycerophosphate for treating structures.

Trial 1:

For this test, a Swiss steel bar of the S500 type was used. This bar was immersed in a 0.1 mol/l sodium nitrate solution and left to corrode until rust appeared on its surface. The electric potential of the steel was measured, right from introducing the bar into the solution, using as reference a silver electrode immersed in a silver chloride solution. The corrosion of the steel lowered its electric potential. After the appearance of rust, lithium glycerophosphate was added to the solution until a 0.1 mol/l concentration of lithium glycerophosphate was obtained. The electric potential of the steel was then observed to increase up to about −160 mV, which meant that the steel had become insensitive to corrosion. This is because it is known that steels whose electric potential is above −200 mV are insensitive to corrosion. FIG. 1 shows the curve of the measured electric potential of the steel constituting the bar as a function of time.

Trial 2:

In this trial, the necessary concentrations of various products for achieving a corrosion-inhibiting effect were compared. The products studied were lithium glycerophosphate and other products used in the prior art as corrosion inhibitors. For each product, four solutions having different concentrations, namely 0.001, 0.01, 0.1 and 1 mol/l, were prepared. After having immersed mild steel specimens in each of the above solutions for 28 days, the steel specimens were examined with the naked eye to see whether or not there were traces of corrosion. Table 1 below gives, for each product, the minimum concentration for preventing the steel from exhibiting any trace of corrosion.

TABLE 1

| Product | Concentration (mol/l) |
|---|---|
| lithium glycerophosphate | 0.001 |
| sodium monofluorophosphate | 1.000 |
| diethanolamine | 0.100 |
| triethanolamine | 0.100 |
| diethanolamine phosphate | 0.010 |
| triethanolamine phosphate | 0.010 |
| triethanolamine borate | 0.100 |

It is apparent from this trial that a very low concentration (0.001 mol/l) of lithium glycerophosphate is sufficient to inhibit corrosion on steel.

Figure 2:
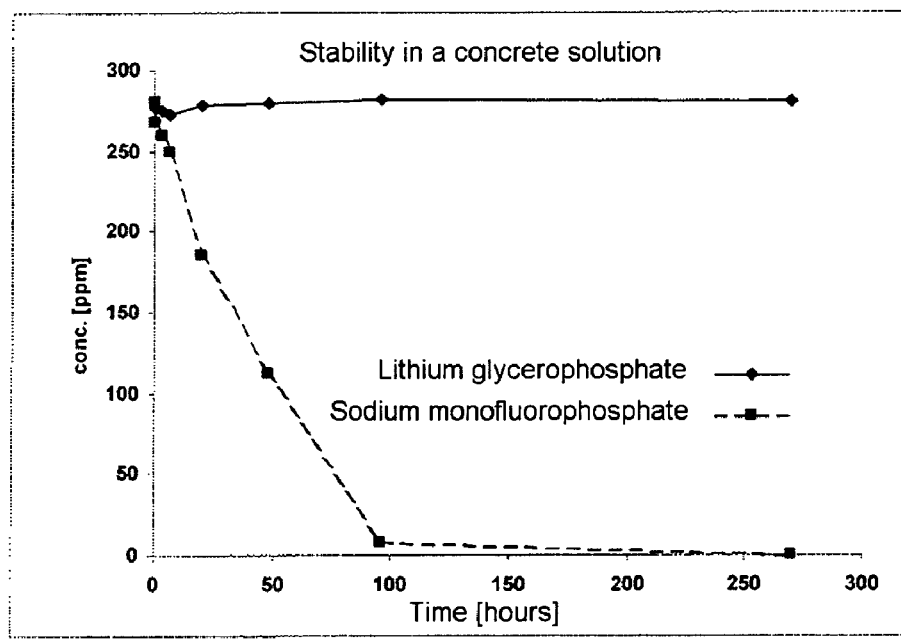

Trial 3:

This trial demonstrates the stability of lithium glycerophosphate in a solution containing 1% concrete powder and 0.2% quickline. The stability of lithium glycerophosphate was compared during this trial with that of sodium monofluorophosphate. FIG. 2 shows the curve of the concentrations of these two products as a function of time. The lithium glycerophosphate concentration remains almost stable, while that of the monofluorophosphate decreases very substantially over time.

Figure 3:
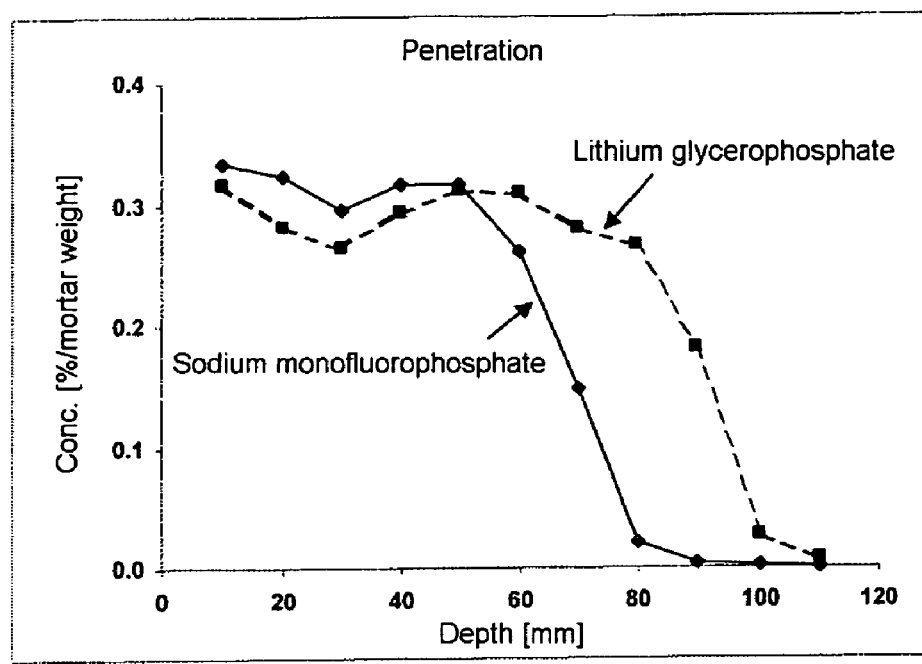

Trial 4:

This trial demonstrates the capability of lithium glycerophosphate to penetrate a concrete structure. In particular, the penetrability of lithium glycerophosphate was compared during this trial with that of sodium monofluorophosphate. To carry out this trial, laboratory-manufactured mortar slabs were used. The lithium glycerophosphate concentration as a function of depth was measured by ion chromatography assay. FIG. 3 shows the concentration of the products in the slabs as a function of the depth. The results demonstrate the good penetrability of lithium glycerophosphate.

Figure 4:
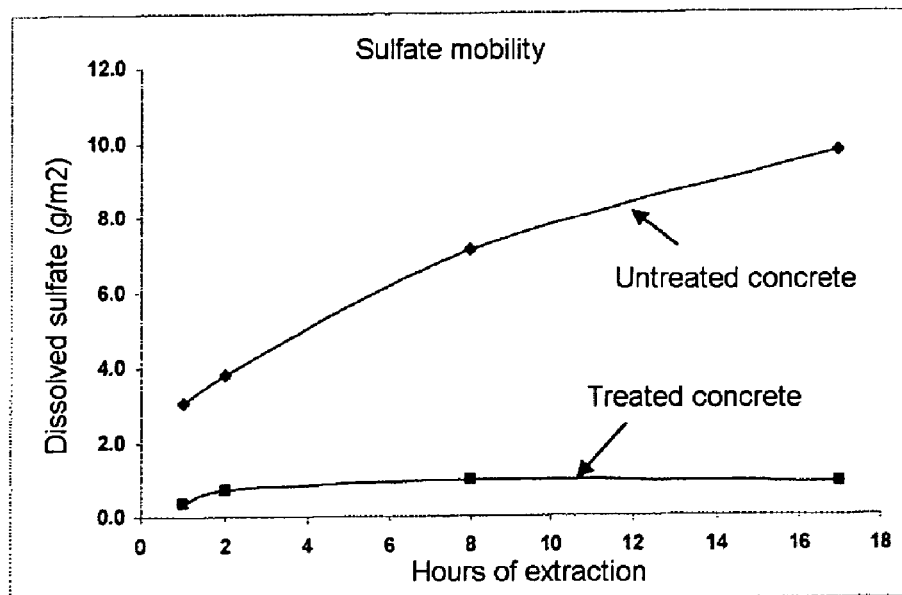

Trial 5:

This trial demonstrates the capability of the lithium element to significantly reduce the mobility of sulfates. A specimen of a concrete contaminated with an excess of sulfates was treated with lithium glycerophosphate and another specimen was untreated. After drying, these specimens were placed on blotting paper containing distilled water. The sulfate concentrations in the blotting papers after various extraction times were measured and plotted on the graph in FIG. 4. The results demonstrate the capacity of lithium to reduce the mobility of sulfates in concrete.

Trial 6:

Effects of lithium glycerophosphate on the environment (phytotoxicity).

Soybeans seeds were placed in an environment containing 0.2% lithium glycerophosphate. The soybean germination step—a crucial phase in its growth—was neither slowed down nor speeded up appreciably by this lithium glycerophosphate concentration.

According to the OCDE 302 B standard, lithium glycerophosphate is 100% biodegradable.

Trial 7:

Effects of lithium glycerophosphate on building materials.

Test Conditions:

Specimens of building materials were cleaned with alcohol. 500 μl of a 2 wt % lithium glycerophosphate solution (one drop) were pipetted onto the surface of the various specimens. After slow evaporation (over 3 to 4 hours) and 24 hours of reaction, the rest of the solution was removed, by simply rinsing with water.

All the following materials were shown to be inert (they did not react with the solution and no visible trace was noted after rinsing): galvanized steel sheet; beige Jura limestone; tinplate; siliceous sandstone; copper; calcareous (Savonnière) sandstone; aluminum; black (Zimbabwe) granite; glass; marble (Carrera); PVC; stoneware (flagstones); unvarnished raw wood (beech).

Sole exception: the color of the oxidized copper was modified owing to the effect of cleaning with the solution. This phenomenon was not observed with oxidized zinc.

Trial 8:

Effect of lithium glycerophosphate on the compressive strength of concrete.

This trial measured the influence of adding a concentrated lithium glycerophosphate solution on the compressive strength of concrete cubes 7 days and 28 days after production.

Description of the Trial:

Several concrete test pieces of cubic shape (20 cm×20 cm×20 cm) were produced from commercial concrete. An excess amount of water was intentionally added during manufacture, this being known to be deleterious to the compressive strength of the test pieces.

Five series of test pieces were manufactured using the same amounts of water. A first series contained no lithium glycerophosphate, a second series contained 0.02% lithium glycerophosphate (relative to the weight of cement), a third series contained 0.05% lithium glycerophosphate (relative to the weight of cement), a fourth series contained 0.13% lithium glycerophosphate (relative to the weight of cement) and the fifth series contained 0.24% lithium glycerophosphate (relative to the weight of cement).

After the various species were matured and stored for 7 days and for 28 days, their compressive strengths were tested on a compression machine and their failure load measured.

Observations:

It was observed (see the results shown in FIGS. 5 and 6) that the addition of lithium glycerophosphate does not affect the compressive strength of the test pieces, whatever the lithium glycerophosphate concentration. From this it may be deduced that lithium glycerophosphate can be used to treat concrete structures without fear of it affecting its strength.

It was also noted that the addition of lithium glycerophosphate greatly increased the compressive strength of the species after 7 days and slightly increased it after 28 days. The graph of FIG. 6 shows the increases in strength of the various test pieces treated relative to the test pieces containing no lithium glycerophosphate.

This substantial increase in strength represents a certain advantage in the production of concrete structures. This is because, owing to this improved strength 7 days after production, successive concreting phases may be brought closer together in time. Thus, structures may be produced more rapidly and leveled more easily.

Trial 9:

Influence of lithium glycerophosphate on the mobility of salts and on the capillary effect in concrete and the effect on steel rebars in this concrete.

Three concrete test pieces were produced using the same method as that used in the previous trial. Steel rebars were placed in these test pieces during their production. The dimensions of the test pieces were the following: height, 20 cm in the case of the first test piece and 15 cm in the case of the second and third test pieces; length, 20 cm; and depth, 9 cm.

The rebars were placed in the height direction and projected from the top of the test pieces.

The first test piece contained no lithium glycerophosphate.

The second and third test pieces contained 0.24% lithium glycerophosphate (relative to the weight of cement) and 0.13% lithium glycerophosphate (relative to the weight of cement) respectively, the lithium glycerophosphate having been added to the cement paste before production of the test pieces.

After maturation of the test pieces for 17 days, they were immersed in a 3% sodium chloride solution up to one half of their height.

For 90 days, six phases of immersing the test pieces in the solution and five phases of drying the test pieces were alternated.

Figure 7:
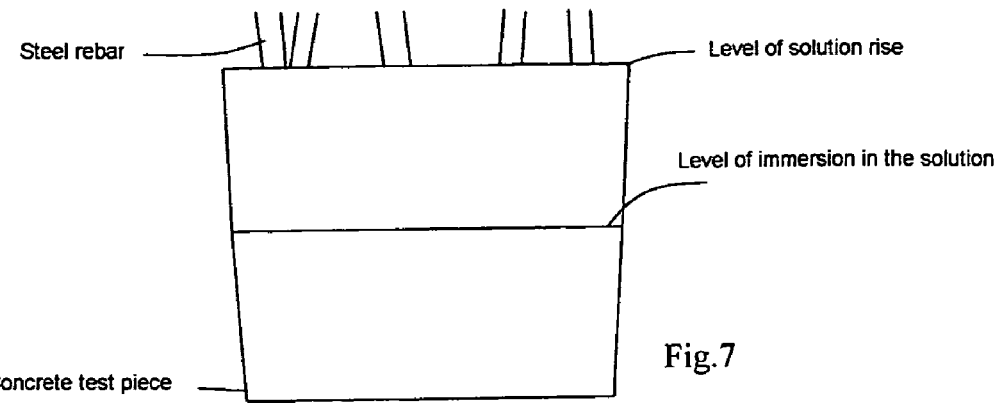
Figure 8:
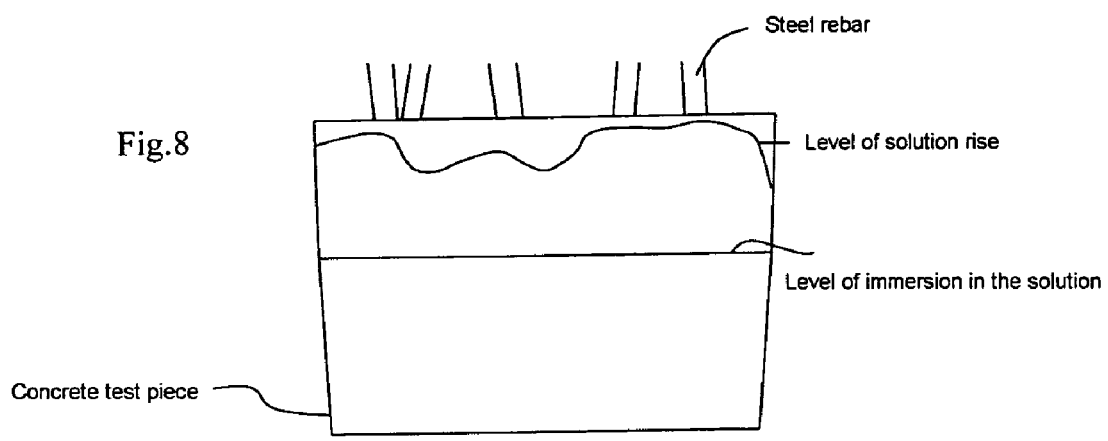
Figure 9:
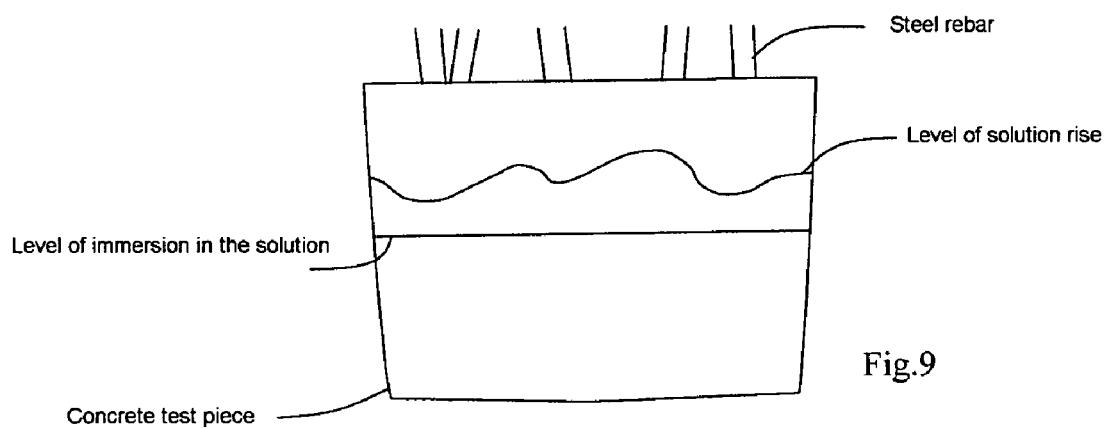

FIGS. 7, 8 and 9 show the levels of capillary rise in the test pieces.

As indicated in FIG. 7, at the end of the last immersion phase, having lasted 3 days, it was noted that the solution had risen by capillary effect to the top of the test piece. In addition, the steel rebars started to show corrosion at the upper surface of the test piece, this corrosion being due to the salts displaced by the capillary rise of the solution.

As indicated in FIGS. 8 and 9, at the end of the last immersion phase, having lasted three days, it was noted that the solution did not rise up to the top of the test pieces. In addition, no onset of corrosion was observed on the steel rebars.

This trial shows that the presence of lithium glycerophosphate in the concrete has reduced the mobility of the ions, as was also described in trial 5.

This trial also shows the ability of the glycerophosphate to reduce the penetration of water into the concrete and, consequently, to reduce the amount of contaminants transported.

The invention claimed is:

1. A method of treating a structure comprising a cement-based product and steel rebars, said method inhibiting rebar corrosion and product degradation due to alkali reactions and to presence of alkalis and sulfates in said structure, said method comprising the following step:
    applying a composition containing lithium glycerophosphate to a surface of said structure.

2. A method as claimed in claim 1, wherein said composition is an aqueous solution.

3. A method as claimed in claim 2, further comprising the following step:
    impregnating said structure with said aqueous solution containing lithium glycerophosphate.

4. A method as claimed in claim 1, wherein an amount of lithium glycerophosphate from 0.003 to 3 mol/m$^2$ is applied.

5. A method as claimed in claim 4, wherein said composition is applied using means selected from the group consisting of a brush, a roller and a spray device.

6. A structure comprising a cement-based product and steel rebars, obtained by a method as claimed in claim 1.

7. A method of treating a structure comprising a cement-based product and steel rebars, wherein said steel rebars are exposed to open air, to inhibit corrosion of said steel rebars, said method comprising the following step:
    covering said rebars with a paint containing lithium glycerophosphate.

8. A method as claimed in claim 7, wherein said paint is an aqueous-based paint.

9. A structure comprising a cement-based product and steel rebars, obtained by a method as claimed in claim 7.

* * * * *